(12) United States Patent
Hong (10) Patent No.: US 11,800,424 B2
(45) Date of Patent: Oct. 24, 2023

(54) INFORMATION TRANSMISSION METHOD, DEVICE AND SYSTEM AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 430 days.

(21) Appl. No.: 17/251,040

(22) PCT Filed: Jun. 14, 2018

(86) PCT No.: PCT/CN2018/091250
§ 371 (c)(1),
(2) Date: Dec. 10, 2020

(87) PCT Pub. No.: WO2019/237302
PCT Pub. Date: Dec. 19, 2019

(65) Prior Publication Data
US 2021/0195496 A1 Jun. 24, 2021

(51) Int. Cl.
*H04W 4/00* (2018.01)
*H04W 36/36* (2009.01)
(Continued)

(52) U.S. Cl.
CPC ........... *H04W 36/36* (2013.01); *B64C 39/024* (2013.01); *G05D 1/0022* (2013.01); *G05D 1/101* (2013.01);
(Continued)

(58) Field of Classification Search
CPC . H04W 36/36; H04W 36/0058; H04W 36/16; H04W 84/005; H04W 74/0833;
(Continued)

(56) References Cited

U.S. PATENT DOCUMENTS 9,836,049 B1    12/2017 Tu
2007/0123290 A1*  5/2007 Stenmark ............ H04W 52/288
                                                 455/343.1
(Continued)

FOREIGN PATENT DOCUMENTS

CN    102508447 A    6/2012
CN    102595604 A    7/2012
(Continued)

OTHER PUBLICATIONS

Li Xiaohui, et al., "LTE Mobile Communication System", Xi'An University Press, Aug. 31, 2016, 4 pages.
(Continued)

*Primary Examiner* — Phuongchau Ba Nguyen
(74) *Attorney, Agent, or Firm* — Finnegan, Henderson, Farabow, Garrett & Dunner, L.L.P.

(57) ABSTRACT

The present disclosure provides an information transmission method, device, system, and storage medium, and relates to the technical field of wireless communication. The method includes: sending by an unmanned aerial vehicle mode switching information to a base station, after the flight mode is switched from a first flight mode to a second flight mode; and receiving by a base station the mode switching information sent by the unmanned aerial vehicle, wherein the mode switching information is configured to indicate that the flight mode of the unmanned aerial vehicle has been switched from the first flight mode to the second flight mode.

18 Claims, 4 Drawing Sheets

(51) Int. Cl.
  *H04W 36/00* (2009.01)
  *B64C 39/02* (2023.01)
  *G05D 1/00* (2006.01)
  *G05D 1/10* (2006.01)
  *H04W 36/16* (2009.01)
  *B64U 10/13* (2023.01)
  *B64U 101/00* (2023.01)

(52) U.S. Cl.
  CPC ....... *H04W 36/0058* (2018.08); *H04W 36/16* (2013.01); *B64U 10/13* (2023.01); *B64U 2101/00* (2023.01)

(58) Field of Classification Search
  CPC . H04W 80/04; H04W 36/18; H04W 36/0011; H04W 36/14; H04W 36/08; B64C 39/024; G05D 1/0022; G05D 1/101; B64U 10/13; B64U 2101/00
  See application file for complete search history.

(56) References Cited

U.S. PATENT DOCUMENTS

| | | | | |
|---|---|---|---|---|
| 2013/0010728 | A1* | 1/2013 | Oguchi | H04W 60/00 370/329 |
| 2014/0187222 | A1* | 7/2014 | Lai | H04W 8/22 455/418 |
| 2016/0205606 | A1* | 7/2016 | Park | H04W 52/0216 455/436 |
| 2017/0273055 | A1* | 9/2017 | Xu | H04W 72/02 |
| 2020/0037367 | A1* | 1/2020 | Kim | H04W 74/006 |
| 2020/0214073 | A1* | 7/2020 | Shimoda | H04W 16/32 |
| 2020/0302799 | A1* | 9/2020 | Hong | G08G 5/0082 |
| 2021/0012665 | A1* | 1/2021 | Wang | H04W 4/42 |
| 2021/0125506 | A1* | 4/2021 | Hong | H04W 4/40 |
| 2022/0124575 | A1* | 4/2022 | Kim | H04W 36/30 |

FOREIGN PATENT DOCUMENTS

| | | |
|---|---|---|
| CN | 102915038 A | 2/2013 |
| CN | 103581885 A | 2/2014 |
| CN | 106950978 A | 7/2017 |
| CN | 107248881 A | 10/2017 |
| CN | 108064360 A | 5/2018 |
| CN | 108064465 A | 5/2018 |
| KR | 20180025264 A | 3/2018 |
| WO | WO 2016/057098 A2 | 4/2016 |
| WO | WO 2018/097497 A1 | 5/2018 |

OTHER PUBLICATIONS

International Search Report of PCT Application No. PCT/CN2018/091250, dated Feb. 22, 2019.
Extended European Search Report in European Application No. 18922669.9, dated May 12, 2021.
Second Office Action Issued in Application No. 201880000663.X, dated Jul. 13, 2021, 26 pages.
Sony, "Discussion on airborne status changing from flying mode to non-flying mode", 3GPP TSG RAN WG2 Meeting #101 bis, R2-1805156, Sanya, China, Apr. 16-20, 2018, 2 pages.
Huawei, HiSilicon, "Potential enhancements for drones", 3GPP TSG RAN WG1 Meeting #89, R1-1707016, Hangzhou, China, May 15-19, 2017, 3 pages.
Office Communication in European Application No. 18922669.9, dated Mar. 22, 2023, 9 pages.
Ericsson, Motivation for new WID on Further Enhanced LTE Support for Aerial Vehicles, RAN #80, La Jolla, CA, US, Jun. 11-14, 2018, RP-181049, 10 pages.

* cited by examiner

INFORMATION TRANSMISSION METHOD, DEVICE AND SYSTEM AND STORAGE MEDIUM

CROSS REFERENCE TO RELATED APPLICATIONS

This application is a national phase application based on International Application No. PCT/CN2018/091250, filed Jun. 14, 2018, the content of which is incorporated herein by reference.

TECHNICAL FIELD

The present disclosure relates to the technology field of wireless communication, and in particular relates to an information transmission method, device, system, and storage medium.

BACKGROUND

Unmanned aerial vehicles, abbreviated as UAVs, are one of unmanned flight vehicles that can be controlled by a radio remote control device. At present, it has become more and more common in people's daily life to connect UAVs to a cellular network and use the cellular network to control UAVs. How to improve the flexibility in controlling UAVs by the cellular network has become an urgent problem.

SUMMARY

Embodiments of the present disclosure provide an information transmission method, device, system, and storage medium, which can improve the flexibility in controlling UAVs by the cellular network.

According to a first aspect of embodiments of the present disclosure, there is provided an information transmission method, comprising:

sending, by an unmanned aerial vehicle, mode switching information to a base station after the flight mode is switched from a first flight mode to a second flight mode; and receiving, by the base station, the mode switching information sent by the unmanned aerial vehicle, wherein the mode switching information is configured to indicate that the flight mode of the unmanned aerial vehicle has been switched from the first flight mode to the second flight mode.

Optionally, the sending, by an unmanned aerial vehicle, mode switching information to a base station after the flight mode is switched from a first flight mode to a second flight mode comprises:

initiating a random access procedure by the unmanned aerial vehicle, and sending the mode switching information to the base station in the random access procedure, after the flight mode is switched from the first flight mode to the second flight mode; and the receiving, by the base station, the mode switching information sent by the unmanned aerial vehicle comprises:

receiving, by the base station, the mode switching information sent by the unmanned aerial vehicle in the random access procedure.

Optionally, the sending the mode switching information to the base station in the random access procedure, comprises:

sending, by the unmanned aerial vehicle, the mode switching information to the base station via a MSG3 in the random access procedure; and the receiving, by the base station, the mode switching information sent by the unmanned aerial vehicle in the random access procedure, comprises:

receiving, by the base station, the mode switching information sent by the unmanned aerial vehicle via the MSG3 in the random access procedure.

Optionally, the mode switching information is carried in a radio resource control connection request (RRCConnectionRequest) signaling of the MSG3.

Optionally, the sending the mode switching information to the base station in the random access procedure, comprises:

sending, by the unmanned aerial vehicle, the mode switching information to the base station via a MSG5 (MSG5) in the random access procedure; and the receiving, by the base station, the mode switching information sent by the unmanned aerial vehicle in the random access procedure, comprises:

receiving, by the base station, the mode switching information sent by the unmanned aerial vehicle via the MSG5 in the random access procedure.

Optionally, the mode switching information is carried in a radio resource control connection setup complete (RRCConnectionSetupComplete) signaling of the MSG5.

Optionally, the first flight mode is a flight mode with a fixed flight path, and the second flight mode is a flight mode with a variable flight path.

Alternatively, the first flight mode is a flight mode with a variable flight path, and the second flight mode is a flight mode with a fixed flight path.

According to a second aspect of embodiments of the present disclosure, there is provided an information transmission device, comprising:

a transmitting module, configured to send mode switching information to a base station after the flight mode is switched from the first flight mode to the second flight mode;

wherein the mode switching information is configured to indicate that the flight mode of an unmanned aerial vehicle has been switched from the first flight mode to the second flight mode.

Optionally, the transmitting module is configured to initiate a random access procedure, and send the mode switching information to the base station in the random access procedure, after the flight mode is switched from the first flight mode to the second flight mode.

Optionally, the transmitting module is configured to send the mode switching information to the base station via a MSG3 in the random access procedure.

Optionally, the mode switching information is carried in a radio resource control connection request (RRCConnectionRequest) signaling of the MSG3.

Optionally, the transmitting module is configured to send the mode switching information to the base station via a MSG5 in the random access procedure.

Optionally, the mode switching information is carried in a radio resource control connection setup complete (RRCConnectionSetupComplete) signaling of the MSG5.

Optionally, the first flight mode is a flight mode with a fixed flight path, and the second flight mode is a flight mode with a variable flight path.

Alternatively, the first flight mode is a flight mode with a variable flight path, and the second flight mode is a flight mode with a fixed flight path.

According to a third aspect of embodiments of the present disclosure, there is provided an information transmission device, comprising:

a receiving module, configured to receive mode switching information sent by an unmanned aerial vehicle;

wherein the mode switching information is sent after the unmanned aerial vehicle has switched the flight mode from a first flight mode to a second flight mode, and the mode switching information is configured to indicate that the flight mode of the unmanned aerial vehicle has been switched from the first flight mode to the second flight mode.

Optionally, the mode switching information is sent by the unmanned aerial vehicle during a random access procedure, which random access procedure is initiated by the unmanned aerial vehicle after the flight mode is switched from the first flight mode to the first flight mode.

Optionally, the receiving module is configured to receive the mode switching information sent by the unmanned aerial vehicle via a MSG3 in the random access procedure.

Optionally, the mode switching information is carried in a radio resource control connection request (RRCConnectionRequest) signaling of the MSG3.

Optionally, the receiving module is configured to receive the mode switching information sent by the unmanned aerial vehicle via a MSG5 in the random access procedure.

Optionally, the mode switching information is carried in a radio resource control connection setup complete (RRCConnectionSetupComplete) signaling of the MSG5.

Optionally, the first flight mode is a flight mode with a fixed flight path, and the second flight mode is a flight mode with a variable flight path.

Alternatively, the first flight mode is a flight mode with a variable flight path, and the second flight mode is a flight mode with a fixed flight path.

According to a fourth aspect of embodiments of the present disclosure, an unmanned aerial vehicle is provided, comprising:

a processor; and a memory, configured to store instructions executable by the processor, wherein the processor is configured to send mode switching information to a base station, after the flight mode is switched from a first flight mode to a second flight mode;

wherein the mode switching information is configured to indicate that the flight mode of the unmanned aerial vehicle has been switched from the first flight mode to the second flight mode.

According to a fifth aspect of embodiments of the present disclosure, there is provided a base station, comprising:

a processor; and a memory, configured to store instructions executable by the processor, wherein the processor is configured to receive mode switching information sent by an unmanned aerial vehicle;

wherein the mode switching information is sent by the unmanned aerial vehicle after the flight mode has been switched from a first flight mode to a second flight mode, and the mode switching information is configured to indicate that the flight mode of the unmanned aerial vehicle has been switched from the first flight mode to the second flight mode.

According to a sixth aspect of embodiments of the present disclosure, an information transmission system is provided. The information transmission system comprises the information transmission device according to any embodiment of the above second aspect, and the information transmission device according to any embodiment of the above third aspect.

According to a seventh aspect of embodiments of the present disclosure, a computer-readable storage medium is provided, wherein at least one instruction is stored in the computer-readable storage medium, and the at least one instruction is configured to be loaded and executed by a processor to implement the information transmission method according to any embodiment of the above-mentioned first aspect.

The technical approach provided by embodiments of the present disclosure may at least comprise the following beneficial effects:

mode switching information is sent by the unmanned aerial vehicle to the base station, after the flight mode is switched from the first flight mode to the second flight mode, so as to report via the mode switching information to the base station that the flight mode of the unmanned aerial vehicle has been switched from the first flight mode to the second flight mode. In this way, the base station can control the unmanned aerial vehicle according to the switched flight mode, which is the second flight mode, after the flight mode of the unmanned aerial vehicle is switched, thereby improving the flexibility in controlling the unmanned aerial vehicle.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, showing embodiments that conform to the present disclosure, and are used along with the specification to explain the principle of the present disclosure.

DETAILED DESCRIPTION OF THE EMBODIMENTS

In order to make the objectives, technical approaches and advantages of the present disclosure clearer, in the following, embodiments of the present disclosure will be described further in detail with reference to the accompanying drawings.

The exemplary embodiments will be described in detail here, and examples thereof are shown in the accompanying drawings. When the following description refers to the accompanying drawings, unless otherwise indicated, the same numbers in different drawings represent the same or similar elements. The implementations as described in the following exemplary embodiments do not represent all the implementations consistent with the present disclosure. Rather, they are only examples of devices and methods consistent with some aspects of the present disclosure as detailed in the appended claims.

UAVs are one of the unmanned flight vehicles that can be operated by a radio remote control device. At present, it has become more and more common in people's daily life to connect UAVs to a cellular network and use the cellular network to control UAVs.

Since the coverage of a single cell in the cellular network is limited, during the flight, the UAV may move from the coverage of one cell to the coverage of another cell. In order to ensure the continuity in the communication services offered by the UAV and prevent the UAV from leaving the control by the cellular network, a process of cell handover needs to be performed on the UAV when the UAV moves from the coverage of one cell to the coverage of another cell.

In practical applications, the flight mode of the UAV can include a fixed flight mode and a dynamic flight mode. Among the two flight modes, the fixed flight mode refers to a flight mode with a fixed flight path. In the fixed flight mode, the UAV's operator can preset the flight path of the UAV, and the UAV can fly according to the preset flight path. The dynamic flight mode refers to a flight mode with a variable flight path. In the dynamic flight mode, the UAV's operator can control the flight of the UAV in real time by a radio remote control device, and the UAV can be controlled by the radio remote control device in real time.

In the fixed flight mode, as the flight path of the UAV is preset, the UAV can send the flight path to the network side of the cellular network (hereinafter referred to as the network side). In this way, the network side can determine, based on the flight path, cells that the UAV will pass by during the flight, which helps to prepare the base station, to which the cells belong, in advance for cell handover.

In the dynamic flight mode, as the flight path of the UAV cannot be predicted, the base station at the network side can instruct the UAV to measure neighboring cells during the flight, and to report the measurement results to the base station. In this way, the base station can perform cell handover for the UAV based on the measurement results.

It can be seen from the above description that in different flight modes, the control strategies required to control the UAV at the network side are likely to be different.

In order to improve the flexibility in controlling UAVs by the cellular network, embodiments of the present disclosure provide an information transmission method. In the information transmission method, the UAV can send a mode switch information to the base station after the flight mode is switched from a first flight mode to a second flight, so as to report via the mode switch information to the base station that the flight mode of the UAV has been switched from the first flight mode to the second flight mode. In this way, the base station can find a suitable control strategy according to the switched flight mode, that is, the second flight mode, after the flight mode of the UAV is switched, and the UAV can be controlled according to such control strategy. Thus, the flexibility in controlling UAVs can be improved.

In the following, a brief description is provided of an implementation environment as involved in the information transmission method proposed by the present disclosure.

Figure 1:
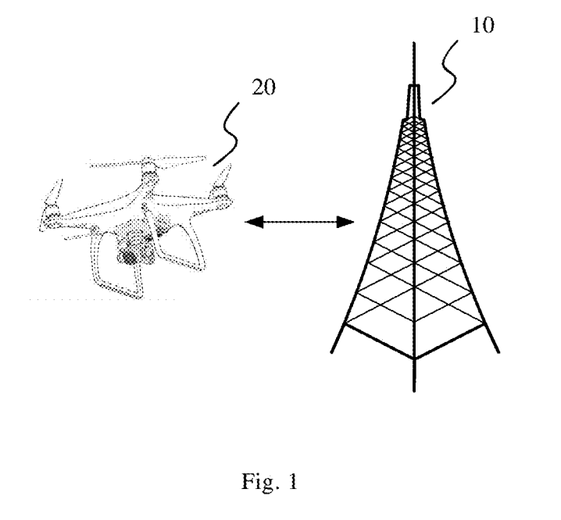
FIG. 1 is a schematic diagram showing an implementation environment according to an exemplary embodiment.

FIG. 1 is a schematic diagram of an implementation environment as involved in the information transmission method proposed by embodiments of the disclosure. As shown in FIG. 1, the implementation environment can comprise a base station 10 and an unmanned aerial vehicle (UAV) 20. The base station 10 and the UAV 20 can be connected by a cellular network. The UAV 20 is any one of the UAVs in the cell served by the base station 10.

The aforementioned cellular network can be a fifth-generation mobile communication technology (abbreviated as 5G) network, a long-term evolution (abbreviated as LTE) network, or other cellular network similar to an LTE network or 5G network.

Figure 2:
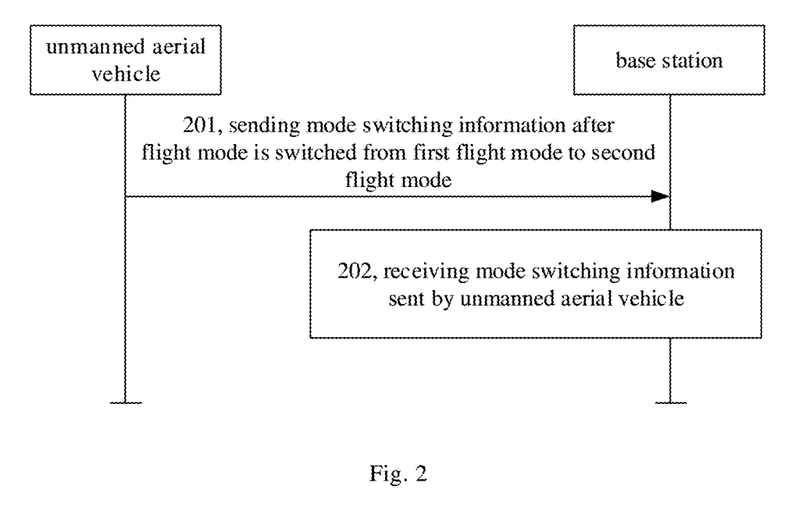
FIG. 2 is a flowchart showing an information transmission method according to an exemplary embodiment.

FIG. 2 is a flow chart showing an information transmission method according to an exemplary embodiment. As shown in FIG. 2, the information transmission method is suitable to be used in the implementation environment shown by FIG. 1. The information transmission method comprises the following steps.

Step 201 is sending, by an UVA, mode switching information to a base station, after the flight mode is switched from a first flight mode to a second flight mode.

The mode switching information is configured to indicate that the flight mode of the UAV has been switched from the first flight mode to the second flight mode.

Step 202 is receiving, by a base station, the mode switching information sent by the UAV.

In summary, according to the information transmission method provided by embodiments of the present disclosure, the mode switching information is sent by the UAV to the base station, after the flight mode is switched from the first flight mode to the second flight mode, so as to report via the mode switching information to the base station that the flight mode of the UAV has been switched from the first flight mode to the second flight mode. In this way, after the flight mode of the UAV is switched, the base station can control the UAV according to the switched flight mode, that is, the second flight mode. Thus, the flexibility in controlling the UAV can be improved.

Figure 3:
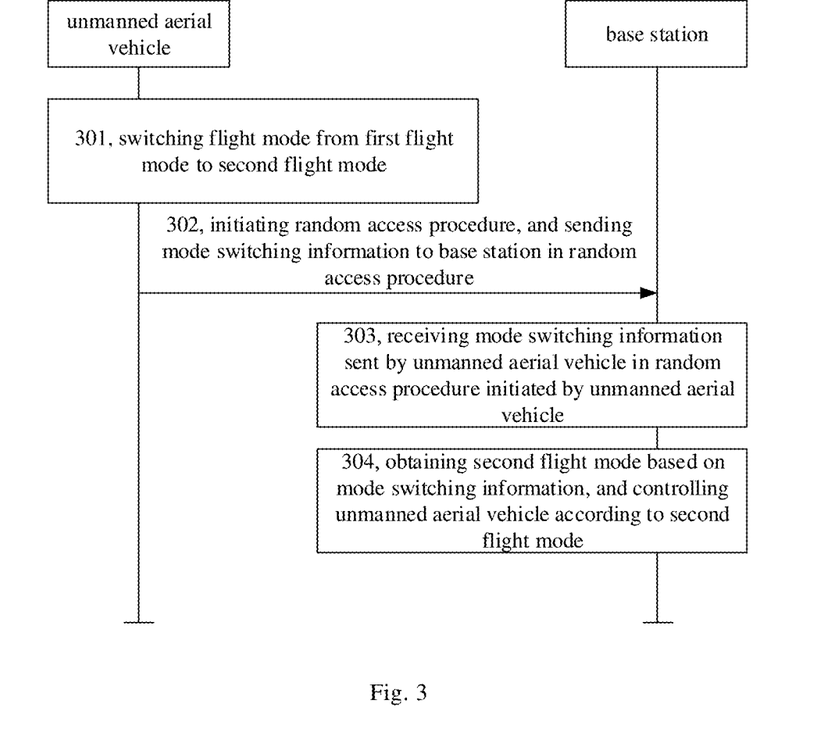
FIG. 3 is a flow chart showing an information transmission method according to an exemplary embodiment.

FIG. 3 is a flowchart of an information transmission method according to an exemplary embodiment. As shown in FIG. 3, the information transmission method is suitable for use in the implementation environment shown by FIG. 1. The information transmission method comprises the following steps.

Step 301 is switching, by an UAV, the flight mode from a first flight mode to a second flight mode.

The first flight mode may be a flight mode with a fixed flight path, i.e., the first flight mode may be a fixed flight mode, and the second flight mode may be a flight mode with a variable flight path, i.e., the second flight mode may be a dynamic flight mode. Alternatively, the first flight mode may be a flight mode with a variable flight path, and the second flight mode may be a flight mode with a fixed flight path.

In the following, merely as an example embodiment of the present disclosure, the first flight mode is a fixed flight mode and the second flight mode is a dynamic flight mode, so as to explain the technical process for switching the flight mode of the UAV from the first flight mode to the second flight mode. The same applies to the case where the first flight mode is a dynamic flight mode and the second flight mode is a fixed flight mode, and the present disclosure will not go into detail in this regard.

In one possible scenario, when the UAV is in a fixed flight mode, the UAV's operator can use a radio remote control device to send control commands to the UAV, and upon receipt of the control commands, the UAV can switch from the fixed flight mode to a dynamic flight mode.

For example, when the UAV is in a fixed flight mode and the UAV's operator observes that the UAV may collide with an obstacle, the UAV's operator can use a radio remote control device to send a control command to the UAV, so as to control the UAV for emergency obstacle avoidance. After receiving the control command, the UAV can switch from the fixed flight mode to a dynamic flight mode, and adjust the flight path according to the control command In another possible case, when the UAV is in a fixed flight mode, a distance sensor installed in the UAV can measure the distance between the UAV and objects around the UAV in real time. When the distance measured by the distance sensor between the UAV and the objects around the UAV is less than a certain threshold value, the UAV can automatically switch from the fixed flight mode to a dynamic flight mode, and perform emergency obstacle avoidance.

Step 302 is initiating, by the UAV, a random access procedure and sending mode switching information to the base station in the random access procedure.

After the first flight mode is switched to the second flight mode, and when the UAV is in an idle state, the UAV can initiate a random access procedure. That is, the UAV can send a random access preamble identifier to the base station on a physical random access channel (abbreviated as PRACH), so that the base station performs the subsequent random access procedure according to the random access precursor code.

The mode switching information is configured to indicate that the flight mode of the UAV has been switched from a first flight mode to a second flight mode. The present disclosure provides two ways for the UAV to send the mode switching information to the base station in the random access procedure.

In the first way, the UAV sends mode switching information to the base station via a Message 3 (MSG3) in the random access procedure.

In this case, the mode switching information can be carried in a radio resource control connection request (RRC-ConnectionRequest) signaling of the MSG3.

In the second way, the UAV sends mode switching information to the base station via a Message 5 (MSG5) in the random access procedure.

In this case, the mode switching information can be carried in the radio resource control connection setup complete (RRCConnectionSetupComplete) signaling of the MSG5.

Step 303 is receiving, by the base station, the mode switching information sent by the UAV in the random access procedure initiated by the UAV.

As similar to the two ways in which the UAV sends the mode switching information to the base station, there may also two ways in which the base station receives the mode switching information.

In the first way, the base station receives the mode switching information sent by the UAV via a MSG3 in the random access procedure.

In the second way, the base station receives the mode switching information sent by the UAV via a MSG5 in the random access procedure.

Step 304 is acquiring, by the base station, the second flight mode according to the mode switching information, and controlling the UAV according to the second flight mode.

After receiving the mode switching information, the base station can acquire the switched flight mode, i.e., the second flight mode, of the UAV according to the mode switching information. After that, the base station can obtain the control strategy corresponding to the second flight mode and control the UAV based on such control strategy.

For example, when the base station determines that the flight mode of the UAV has been switched from a fixed flight mode to a dynamic flight mode based on the mode switching information sent by the UAV, the base station can notify each base station on the original flight path of the UAV to stop its preparation for cell handover, and at the same time, the base station can also instruct the UAV to measure the neighboring cells.

In summary, according to the information transmission method provided by embodiments of the present disclosure, mode switching information is sent by the UAV to the base station after the UAV has switched the flight mode from the first flight mode to the second flight mode, so as to report via the mode switching information to the base station that the flight mode of the UAV has been switched from the first flight mode to the second flight mode. In this way, after the UAV has switched the flight mode, the base station can control the UAV based on the switched flight mode, i.e., the second flight mode, thus allowing for a greater flexibility in controlling the UAV.

Figure 4:
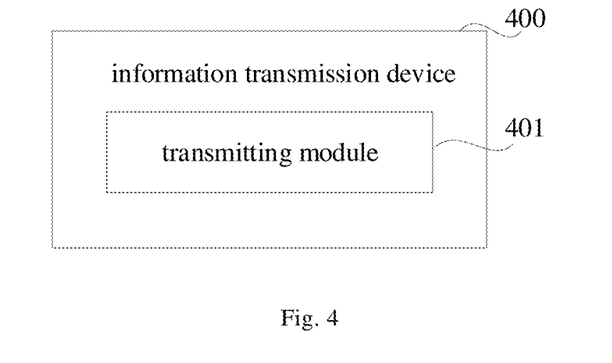
FIG. 4 is a block diagram showing an information transmission device according to an exemplary embodiment.

FIG. 4 is a block diagram of an information transmission device 400 according to an exemplary embodiment. The information transmission device 400 can be disposed in the UAV 20 shown in FIG. 1. Referring to FIG. 4, the information transmitting device 400 comprises a transmitting module 401.

The transmitting module 401 is configured to send mode switching information to the base station after the flight mode is switched from the first flight mode to the second flight mode. The mode switching information is configured to indicate that the flight mode of the UAV has been switched from the first flight mode to the second flight mode.

In an embodiment of the present disclosure, the transmitting module 401 is configured to initiate a random access procedure and send the mode switching information to the base station in the random access procedure, after the flight mode is switched from the first flight mode to the second flight mode.

In an embodiment of the present disclosure, the transmitting module 401 is configured to send the mode switching information to the base station via a MSG3 in the random access procedure.

In an embodiment of the present disclosure, the mode switching information is carried in a radio resource control connection request (i.e., RRCConnectionRequest) signaling of the MSG3.

In an embodiment of the present disclosure, the transmitting module 401 is configured to send the mode switching information to the base station via a MSG4 in the random access procedure.

In an embodiment of the present disclosure, the mode switching information is carried in a radio resource control connection setup complete (i.e., RRCConnectionSetupComplete) signaling of the MSG4.

In an embodiment of the present disclosure, the first flight mode is a flight mode with a fixed flight path, and the second flight mode is a flight mode with a variable flight path. Alternatively, the first flight mode is a flight mode with a variable flight path, and the second flight mode is a flight mode with a fixed flight path.

In summary, according to the information transmission device provided by embodiments of the present disclosure, mode switching information is sent to the base station after the flight mode is switched from the first flight mode to the second flight mode, so as to report via the mode switching information to the base station that the flight mode of the UAV has been switched from the first flight mode to the second flight mode. In this way, after the flight mode of the UAV has been switched, the base station can control the UAV according to the switched flight mode, i.e., the second flight mode, thus increasing the flexibility in controlling the UAV.

With respect to the device proposed in the above embodiments, the specific manner in which the individual components perform their operations has been described in detail in the example embodiments of the above method, and will not be described in detail herein.

Figure 5:
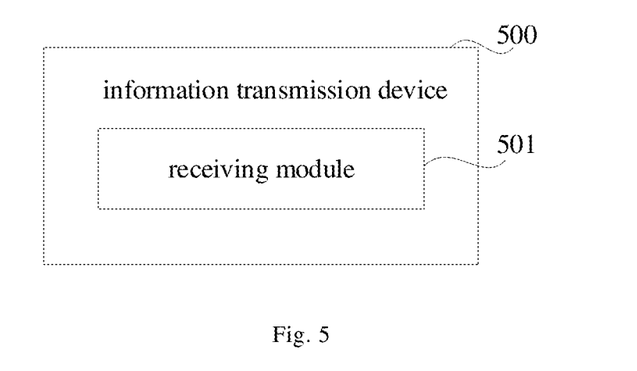
FIG. 5 is a block diagram showing an information transmission device according to an exemplary embodiment.

FIG. 5 is a block diagram of an information transmission device 500 according to an exemplary embodiment, which information transmission device 500 can be disposed in the base station 10 shown in FIG. 1. Referring to FIG. 5, the information transmitting device 500 comprises a receiving module 501.

The receiving module 501 is configured to receive the mode switching information sent by the UAV. The mode switching information is sent by the UAV after it has switched the flight mode from the first flight mode to the second flight mode. The mode switching information is configured to indicate that the flight mode of the UAV has been switched from the first flight mode to the second flight mode.

In an embodiment of the present disclosure, the mode switching information is sent by the UAV in a random access procedure, which random access procedure is initiated by the UAV after the flight mode is switched from that first flight mode to that second flight mode.

In an embodiment of the present disclosure, the receiving module 501 is configured to receive the mode switching information sent by the UAV via a MSG3 in the random access procedure.

In an embodiment of the present disclosure, the mode switching information is carried in a radio resource control connection request (i.e., RRCConnectionRequest) signaling of the MSG3.

In an embodiment of the present disclosure, the receiving module 501 is configured to receive the mode switching information sent by the UAV via a MSG5 in the random access procedure.

In an embodiment of the present disclosure, the mode switching information is carried in a radio resource control connection setup complete (i.e., RRCConnectionSetupComplete) signaling of the MSG5.

In an embodiment of the present disclosure, the first flight mode is a flight mode with a fixed flight path, and the second flight mode is a flight mode with a variable flight path. Alternatively, the first flight mode is a flight mode with a variable flight path, and the second flight mode is a flight mode with a fixed flight path.

In summary, according to the information transmission device provided by embodiments of the present disclosure, the mode switching information, sent by the UAV after switching the flight mode from the first flight mode to the second flight mode, is received by the base station, wherein the mode switching information is configured to indicate that the flight mode of the UAV has been switched from the first flight mode to the second flight mode. In this way, after the flight mode of the UAV has been switched, the base station can control the UAV according to the switched flight mode, i.e., the second flight mode, thus allowing for a greater flexibility in controlling the UAV.

With respect to the device proposed in the above embodiments, the specific manner in which the individual components perform their operations has been described in detail in the example embodiments of the above method, and will not be described in detail herein.

Figure 6:
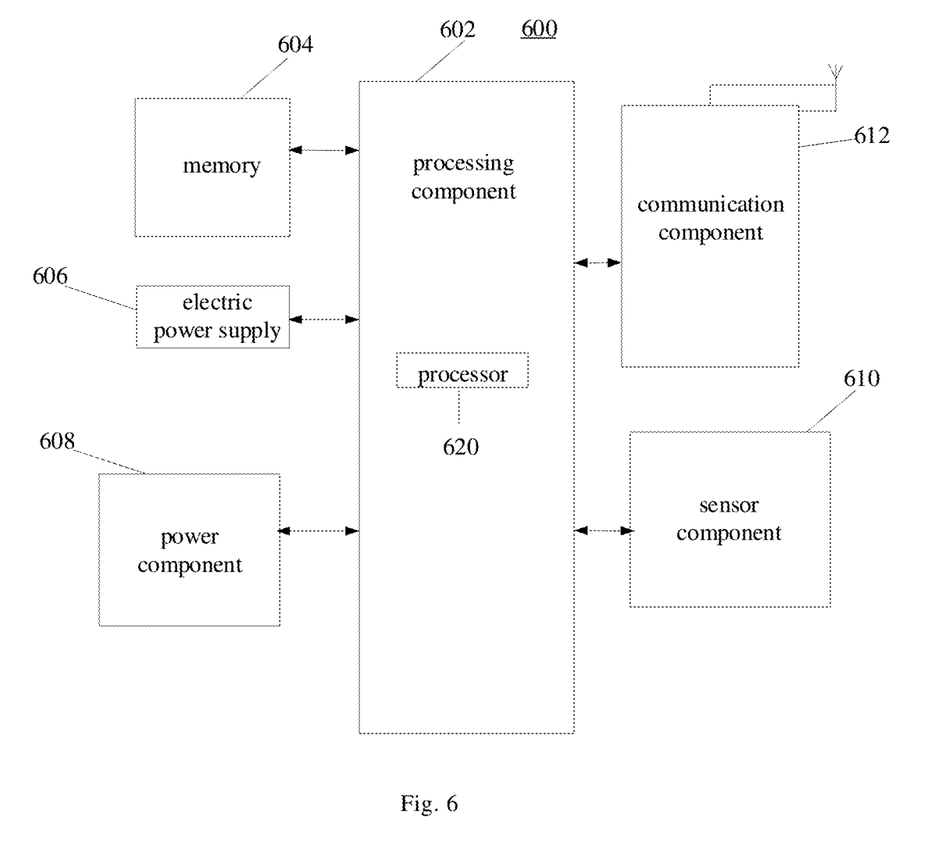
FIG. 6 is a block diagram showing an information transmission device according to an exemplary embodiment.

FIG. 6 is a block diagram of an information transmission device 600 according to an exemplary embodiment. For example, the device 600 can be an UAV.

Referring to FIG. 6, the device 600 can comprise one or more of the following components: a processing component 602, a memory 604, an electric power supply 606, a power component 608, a sensor assembly 610, and a communication component 612.

The processing component 602 typically controls the overall operation of the device 600, for example communicates with data, changes altitude, changes flight direction, and switches flight mode. The processing component 602 can comprise one or more processors 620 to execute instructions, such that all or some of the steps in the above described method are accomplished. Additionally, the processing component 602 can comprise one or more modules to facilitate interactions between the processing component 602 and other components. For example, the processing component 602 can comprise a sensor module to facilitate interactions between the sensor assembly 610 and the processing component 602.

The memory 604 is configured to store various types of data to support operations of the device 600. Examples of such data comprise, for example, instructions for any applications or methods installed in the device 600. The memory 604 can be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, Disk or CD.

The electric power supply 606 provides electric power to various components of the device 600. The electric power supply 606 can comprise a power management system, one or more electric power sources, and other components associated with the generation, management and distribution of electric power for the device 600.

The power assembly 608 can provide power for the flight of the UAV, and can change the flight altitude and the flight direction of the UAV, etc., under the control of the processing component 602.

The sensor assembly 610 comprises one or more sensors for providing a status assessment of various aspects of the device 600. For example, the sensor assembly 610 can detect changes in the orientation or the acceleration/deceleration and the temperature of the device 600. The sensor assembly 610 can comprise a proximity sensor, which is configured to detect the presence of nearby objects in the absence of any physical contact. The sensor assembly 610 can also comprise an optical sensor, such as a CMOS or CCD image sensor, for use in imaging applications. According to some embodiments, the sensor assembly 610 can also comprise an acceleration sensor, a gyroscope sensor, a magnetic sensor, a pressure sensor, or a temperature sensor.

The communication component 612 is configured to facilitate a wired or wireless communication between the device 600 and other devices. The device 600 can have access to a wireless network based on a communication standard, such as WiFi, 2G, 3G, or a combination thereof. According to an exemplary embodiment, the communication component 612 receives a broadcast signal or broadcast-related information from an external broadcast management system on a broadcast channel. According to an exemplary embodiment, the communication component 612 also comprises a near-field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology, and other technologies.

In exemplary embodiments, the device 600 can be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the method described above.

In an exemplary embodiment, there is also provided a non-transitory computer-readable storage medium containing instructions, such as a memory 604 containing instructions, which instructions can be executed by the processor 620 of the device 600 for implementing the method as described above. For example, the non-transitory computer-readable storage medium can be ROM, random access memory (RAM), CD-ROM, magnetic tape, floppy disks, and optical data storage devices, among others.

In exemplary embodiments, a non-transitory computer-readable storage medium is also provided. This enables the UAV to perform the information transmission method provided by the present disclosure, when instructions contained in the storage medium are executed by the processor of the UAV.

Figure 7:
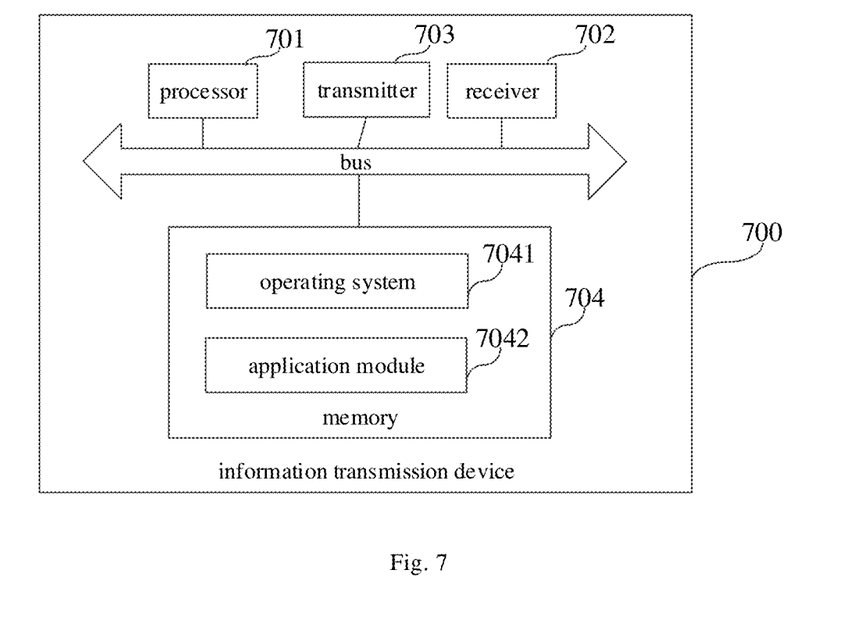
FIG. 7 is a block diagram showing an information transmission device according to an exemplary embodiment.

FIG. 7 is a block diagram of an information transmission device 700 according to an exemplary embodiment. For example, the information transmission device 700 can be a base station. As shown in FIG. 7, the information transmission device 700 can comprise: a processor 701, a receiver 702, a transmitter 703, and a memory 704. The receiver 702, the transmitter 703, and the memory 704 are each connected to the processor 701 via a respective bus.

The processor 701 comprises one or more processing cores, and by running a software program as well as a module, the processor 701 executes the steps as performed by the base station in the information transmission method provided by the present disclosure. The memory 704 can be configured to store the software program as well as the module. Specifically, the memory 704 can store an operating system 7041, and an application module 7042 required for at least one function. The receiver 702 is configured to receive communication data sent by other devices, and the transmitter 703 is configured to send communication data to other devices.

Figure 8:
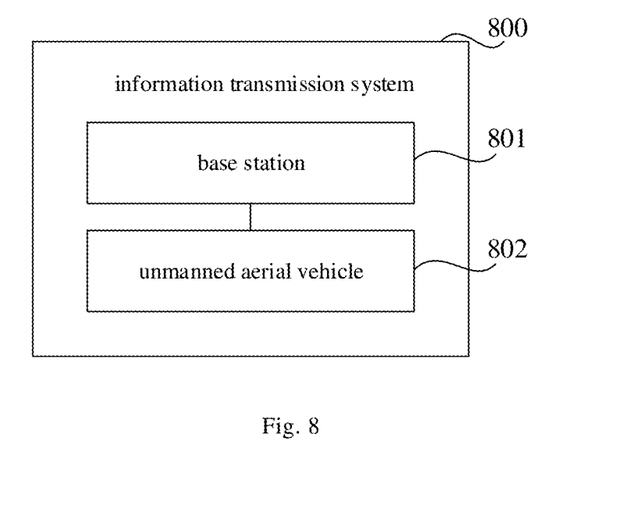
FIG. 8 is a block diagram showing an information transmission system according to an exemplary embodiment.

FIG. 8 is a block diagram of an information transmission system 800 according to an exemplary embodiment. As shown in FIG. 8, the information transmission system 800 comprises a base station 801 and a UAV 802.

The base station 801 is configured to perform the information transmission method as performed by the base station in the example shown by FIG. 4.

The UAV 802 is configured to perform the information transmission method as performed by the UAV in the example shown by FIG. 4.

In an exemplary embodiment, there is also provided a computer-readable storage medium that is a non-volatile computer-readable storage medium in which a computer program is stored, which computer program is configured, when executed by a processing component, to implement the information transmission method provided by the above-mentioned embodiments of the present disclosure.

The present disclosure also provides a computer program product having instructions stored therein, wherein the instructions are configured, when run on a computer, such that the computer performs the information transmission method provided by the present disclosure.

The present disclosure also provides a chip containing a programmable logic circuitry and/or program instructions, which enables the chip, when operating, to perform the information transmission method provided by the present disclosure.

Those of skill in the art will readily think of other embodiments of the present disclosure after considering the present specification and putting the present invention disclosed herein into practise. The present application is intended to cover any variations, uses or adaptations of the present disclosure that follow the general principle of the present disclosure, and encompasses the common knowledge or customary technical means in the art that are not disclosed herein. Descriptions and examples are considered to be exemplary only, and the true scope and spirit of the present disclosure is indicated by the following claims.

It is to be understood that the present disclosure is not limited to the precise structures that are already described above and shown in the accompanying drawings, and that various modifications and changes can be made without departing from the scope of the present disclosure. The scope of the present disclosure is limited only by the appended claims.

The invention claimed is:

1. An information transmission method, comprising:
sending, by an unmanned aerial vehicle, mode switching information to a base station, after a flight mode is switched from a first flight mode to a second flight mode,
wherein the mode switching information is configured to indicate that the flight mode of the unmanned aerial vehicle has been switched from the first flight mode to the second flight mode, and
the first flight mode is a flight mode with a fixed flight path and the second flight mode is a flight mode with a variable flight path, or the first flight mode is a flight mode with a variable flight path and the second flight mode is a flight mode with a fixed flight path.

2. The information transmission method according to claim 1, wherein the sending, by an unmanned aerial vehicle, mode switching information to a base station, after a flight mode is switched from a first flight mode to a second flight mode, comprises:
initiating, by the unmanned aerial vehicle, a random access procedure, and sending the mode switching information to the base station in the random access procedure, after the flight mode is switched from the first flight mode to the second flight mode.

3. The information transmission method according to claim 2, wherein the sending the mode switching information to the base station in the random access procedure, comprises:
sending, by the unmanned aerial vehicle, the mode switching information to the base station via a Message 3 (MSG3) in the random access procedure.

4. The information transmission method according to claim 3, wherein the mode switching information is carried in a radio resource control connection request (RRCConnectionRequest) signaling of the MSG3.

5. The information transmission method according to claim 2, wherein the sending the mode switching information to the base station in the random access procedure, comprises:

sending, by the unmanned aerial vehicle, the mode switching information to the base station via a Message 5 (MSG5) in the random access procedure.

6. The information transmission method according to claim 5, wherein the mode switching information is carried in a radio resource control connection setup complete (RRC-ConnectionSetupComplete) signaling of the MSG5.

7. An information transmission device, comprising:
a processor; and
a memory, configured to store instructions executable by the processor,
wherein the processor is configured to, when executing the instructions, send mode switching information to a base station, after a flight mode is switched from a first flight mode to a second flight mode,
wherein the mode switching information is configured to indicate that the flight mode of an unmanned aerial vehicle has been switched from the first flight mode to the second flight mode, and
the first flight mode is a flight mode with a fixed flight path and the second flight mode is a flight mode with a variable flight path, or the first flight mode is a flight mode with a variable flight path and the second flight mode is a flight mode with a fixed flight path.

8. The information transmission device according to claim 7, wherein the processor is configured to, when executing the instructions,
initiate a random access procedure and send the mode switching information to the base station in the random access procedure, after the flight mode is switched from the first flight mode to the second flight mode.

9. The information transmission device according to claim 8, wherein the processor is configured to, when running the instructions,
send the mode switching information to the base station via a Message 3 (MSG3) in the random access procedure.

10. The information transmission device according to claim 9, wherein the mode switching information is carried in a radio resource control connection request (RRCConnectionRequest) signaling of the MSG3.

11. The information transmission device according to claim 8, wherein the processor is configured to, when executing the instructions,
send the mode switching information to the base station via a Message 5 (MSG5) in the random access procedure.

12. The information transmission device according to claim 11, wherein the mode switching information is carried in a radio resource control connection setup complete (RRC-ConnectionSetupComplete) signaling of the MSG5.

13. An information transmission device, comprising:
a processor; and
a memory, configured to store instructions executable by the processor,
wherein the processor is configured to, when executing the instructions, receive mode switching information sent by an unmanned aerial vehicle,
wherein the mode switching information is sent by the unmanned aerial vehicle after a flight mode is switched from a first flight mode to a second flight mode, and the mode switching information is configured to indicate that the flight mode of the unmanned aerial vehicle has been switched from the first flight mode to the second flight mode, and
the first flight mode is a flight mode with a fixed flight path and the second flight mode is a flight mode with a variable flight path, or the first flight mode is a flight mode with a variable flight path and the second flight mode is a flight mode with a fixed flight path.

14. The information transmission device according to claim 13, wherein the mode switching information is sent by the unmanned aerial vehicle in a random access procedure, and the random access procedure is initiated by the unmanned aerial vehicle after the flight mode is switched from the first flight mode to the second flight mode.

15. The information transmission device according to claim 14, wherein the processor is configured to, when executing the instructions,
receive the mode switching information sent by the unmanned aerial vehicle via a Message 3 (MSG3) in the random access procedure.

16. The information transmission device according to claim 15, wherein the mode switching information is carried in a radio resource control connection request (RRCConnectionRequest) signaling of the MSG3.

17. The information transmission device according to claim 14, wherein the processor is configured to, when executing the instructions,
receive the mode switching information sent by the unmanned aerial vehicle via a Message 5 (MSG5) in the random access procedure.

18. The information transmission device according to claim 17, wherein the mode switching information is carried in a radio resource control connection setup complete (RRC-ConnectionSetupComplete) signaling of the MSG5.

\* \* \* \* \*